June 3, 1941.  J. T. McNANEY  2,244,497
RECORDING DEVICE
Filed Sept. 27, 1939
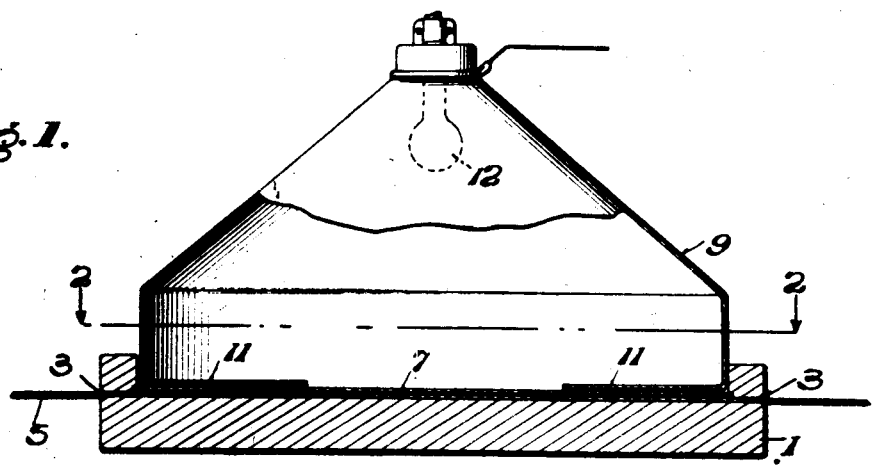
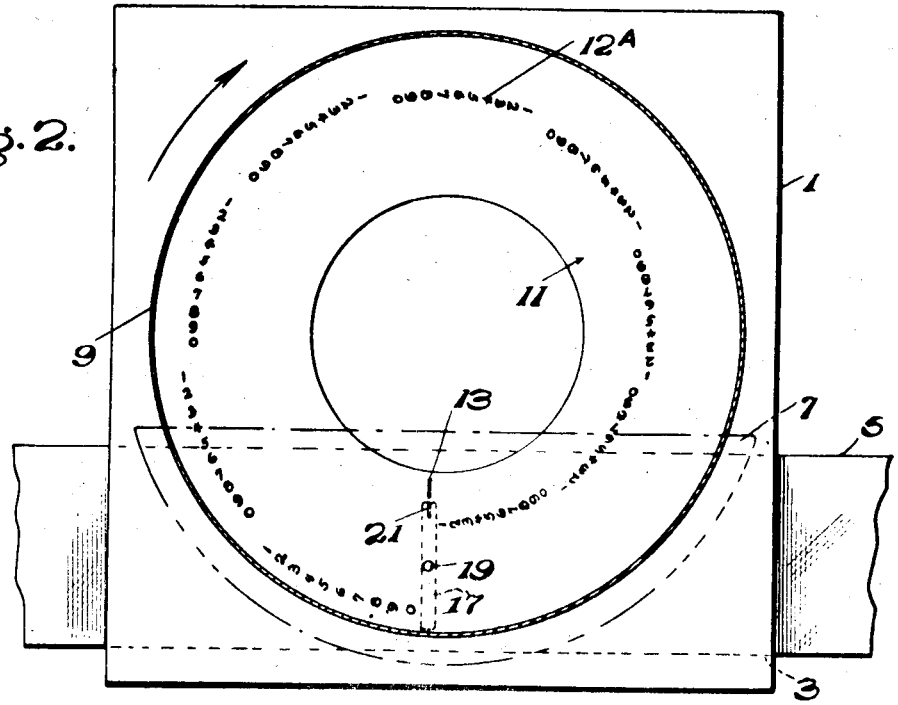
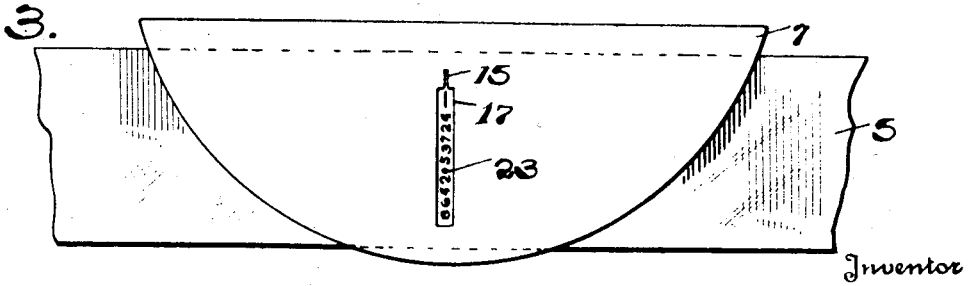
Inventor
Joseph T. McNaney.
By T. R. Goldsborough.
Attorney Patented June 3, 1941

2,244,497

UNITED STATES PATENT OFFICE 2,244,497

RECORDING DEVICE

Joseph T. McNaney, Baltimore, Md.

Application September 27, 1939, Serial No. 296,798

7 Claims. (Cl. 234—69)

My invention relates to recording devices and more particularly to apparatus for making photographic reproductions, at a central record-station, of the readings of a plurality of electric or other meters or registers, disposed remotely therefrom.

This application is a continuation in part of my copending application, Serial No. 236,677, filed October 24, 1939. For that reason, it is to be understood that reference may be made thereto for a clearer understanding of apparatus and circuits described therein but not illustrated.

In the said copending application, I have disclosed and described means and circuits whereby the instantaneous readings of a plurality of meters may be recorded, consecutively, upon a single strip of photo-sensitive material at a central record station. More specifically, I have disclosed means whereby the movement of each meter, when current is being consumed at its location, causes a plurality of concentrically disposed contact elements corresponding, respectively, to the indicating pointers of the meter, to be circumferentially displaced with respect to one another. A meter-scale, bearing visible numerals 1, 2, 3, 4, 5, 6, 7, 8, 9 and 0, is allocated to each contact-element, the said numeral-series being disposed along arcs respectively corresponding to the extent of circumferential movement of the said contact-elements with respect to each other and with respect to their individual scales give a reading of the total current consumed.

I have also disclosed means whereby a series of electrical impulses may be sent periodically and automatically from each of a plurality of meters to a central station, which impulses are utilized thereat for the purpose of controlling a photographic recorder. Such means is constituted by a grounded wiper common to the said contact elements and means for causing the wiper, once every thirty days, to make one revolution in one minute and to sequentially engage the contact elements thereby sending into a transmission line a series of time-spaced electrical impulses, the spacing in time between successive impulses corresponding to the angular displacement between successive meter-actuated contact elements.

Furthermore, I have disclosed each meter as bearing a series of concentric, angularly separated fixed contact elements, so disposed as to also be engaged by the wiper during a portion of its rotation, the said fixed contact elements and wiper serving to send into the transmission line a series of electrical impulses corresponding to the number of the meter.

In the said parent application, I have also disclosed means for making permanent photographic records, at the central station, of the number of each meter and of the instantaneous reading thereof. For that purpose, I prefer to utilize a strip of sensitized paper or the like, an unexposed portion of which is moved into recording position by a motor just after the reception of a train of signals corresponding to the number and reading of any given meter. The strip of photo-sensitive material, under control of automatic mechanism, is caused to intermittently advance, and during its rest periods, it is exposed to light from a source that is controlled by the signals representative of the meter number and reading. In the parent application I have shown a generally translucent fixed mask interposed between the light source and the paper, on which mask is printed a replica of a meter dial. The signal-controlled lamp is provided with a depending, rotatable housing that carries at its lower end an inwardly directed opaque rim disposed in a plane parallel and closely adjacent to the mask, the inner periphery of the rim stopping just short of the indicia printed on the mask. The rim has a small triangular opening through which light from the signal-controlled lamp may reach the paper. Mechanism is provided whereby the housing is set into rotary motion under control of the first signal of a train of signals from any given meter and is caused to rotate in synchronism with the wiper at the particular meter from which the signal-train emanates, making one revolution and then stopping to remain at rest until a train of signals from a different meter comes in. During the revolution of the housing, the light source is caused to be intermittently energized under the control of incoming impulses corresponding to the instantaneous angular positions of the meter-dial contact elements representing the reading and number of the meter sending the impulses. The light, therefore, reaching the sensitized material through the triangular opening, imprints thereon two circumferentially disposed series of angularly displaced marks, one series corresponding to the meter number and the other series corresponding to the meter reading.

While the recording device per se constructed according to my original invention provides a replica of a distant meter dial or scale, which may be necessary in some types of recording, the object of the present invention is to provide a photographic recording device, susceptible of utilization in the system first disclosed, that will photographically show two sets of numerals which will represent a number of a distant meter or register, and its total reading.

Another object of my invention is to provide a recording device that shall require a minimum of photo-sensitive material for each individual record.

A still further object of my invention is to provide a device of the foregoing description that shall make an easily and quickly readable record.

I attain these objects in accordance with the present invention by radically modifying the inwardly projecting rim of the lamp housing and by a radical change in the mask interposed between said rim and the sensitized material supporting device.

The novel features that I consider characteristic of my invention are set forth with particularity in the appended claims. The invention in its entirety, however, both as to its organization and its method of operation, together with additional objects and advantages thereof, will best be understood from the following description of a specific embodiment when read in connection with the accompanying drawing, wherein:

Fig. 1 is a side view, partly sectionalized, of my improved photographic recording device;

Fig. 2 is a horizontal sectional view of the device, taken along a plane corresponding to the line 11—11 in Fig. 1, and Fig. 3 is a diagrammatic plan view exemplifying the manner in which the rim of the rotatable lamp housing and the modified mask cooperate to make a photographic record of the number and reading of a distantly disposed meter.

Referring now to Fig. 1 of the drawing, my improved recording device includes 4 essential elements, namely, a cup shaped base 1 having an offset slot 3 at each side through which a strip of sensitized paper 5 or the like is caused to move intermittently by take-up mechanism (not shown), a generally opaque mask 7 mounted on the paper supporting element in a plane closely adjacent and parallel to the plane of the paper and a rotatable lamp housing 9 having an inwardly directed rim 11 at its bottom which rim overlies and is disposed closely adjacent and parallel to the aforesaid mask. A lamp 12 is supported in the upper end of the housing. The slots in the paper supporting element, the lower edge of the housing and the lower surface of the mask may be provided with strips of velvet, for the purpose of preventing extraneous light from "fogging" the sensitized paper.

The inwardly directed, generally opaque, rim of the lamp housing is provided with a plurality of series 12A of openings therethrough, the openings in each series conforming to the numerals, 1, 2, 3, 4, 5, 6, 7, 8, 9 and 0. One numeral of each series therefore, is imprinted upon the strip of photo-sensitive paper, when it is at rest, depending upon the angular position of the rotatable housing at the instants the lamp is energized under control of electrical impulses emanating from a remotely disposed impulse sending device, such as is described hereinabove.

The several series of numbers are arranged along concentric, angularly separated arcs, each arc being located radially farther away from the center of rotation of the housing than the next preceding arc.

The inwardly directed rim is also provided with a very small radial rectangular opening 13 closer to the inner edge thereof than the first series of numeral openings, which opening, when the apparatus is at rest, registers, with a small rectangular opening 15 that merges into a large rectangular opening 17 radially disposed in the opaque mask.

The rim is also provided with a very small circular opening 19 at a radial distance from the center of rotation of the housing half way between the beginning of the inner-most series of numeral-openings and the ending of the outer-most series.

Inasmuch as my present invention pertains principally to the rim of the housing and to the fixed mask no necessity is seen for illustrating ancillary mechanism, including motors and relays which move the paper and which set the housing into rotary movement in synchronism with rotation of the impulse sending wiper at a distantly located meter and, furthermore, the omitted details including means for causing the lamp to flash, will be found in the copending application to which reference already has been made. Also, I have omitted any showing of the take-up roller for the exposed photo-sensitive material as well as the supply roller. Such rollers, as will be obvious to those skilled in the art of photography, must of necessity have light-proof housings.

When the apparatus is at rest the small opening in the rotatable rim is located centrally of the relatively large rectangular opening in the mask, the two innermost rectangular openings through the mask and rim, respectively, are in registry and a small additional rectangular radial opening 21 in the rim is aligned with the said two openings in a radial direction.

The first signal of a train of electrical impulses coming from a distant meter, as explained in the copending application, causes the lamp to flash before the housing is set into rotary movement. The initial flash of the lamp, if the small rectangular openings are in proper registry will cause the printing of two radially aligned rectangular marks upon the photo-sensitive strip as exemplified in Fig. 3 of the drawing, and will also cause a small dot 23 to be printed thereon centrally of the large rectangular openings in alignment with the aforementioned rectangular marks. Perfect radial alignment of the three marks indicates that the housing was in the correct starting position and provides a criterion whereby a correction factor may be introduced into a meter reading. The small dot on the photo-sensitive paper caused by light passing through the relatively small circular opening in the rim serves the purpose of separating the meter number from the meter reading when the strip is developed.

Assuming that the initial signal has been received in the manner just referred to, the housing automatically starts rotating in the direction indicated by the arrow in Fig. 1. Subsequent flashes of the light under control of later signals in the train, inasmuch as the housing rotates once in synchronism with the wiper at the meter from which the signals are coming, each cause one numeral of each of the series of numeral-openings to be imprinted, in succession, upon the photo-sensitvie strip as exemplified by Fig. 3 of the drawing. In the figure referred to, the final meter number is 53,724 and the final meter reading is 8642.

Although I have disclosed and described the preferred embodiment of my invention, alternative embodiments will be apparent to those skilled in the art to which it pertains. My invention, therefore, is not to be restricted except insofar as is necessitated by the appended claims.

I claim as my invention:

1. In a photographic recorder, a rotatable lamp-housing having an inwardly directed rim, the said rim being provided with a plurality of arcuately disposed series of openings, the openings in each series being shaped, respectively, like the numerals 1, 2, 3, 4, 5, 6, 7, 8, 9 and 0, the series being angularly separated and located at different distances from the axis of rotation.

2. In combination, in a photographic recorder, a rotatable lamp-housing having an inwardly directed opaque rim, the said rim being provided with a plurality of series of openings, the said series being arcuately disposed in circumferential succession, and located at different distances from the axis of rotation, the openings in each series being shaped, respectively, like the numerals 1, 2, 3, 4, 5, 6, 7, 8, 9, 0, and a fixed mask supported in a plane parallel and closely adjacent to the plane of the rim, the said fixed mask being generally opaque and having a rectangular opening into registry with which the numeral-openings in the rim are successively brought upon rotation of the housing.

3. The invention set forth in claim 1, additionally characterized in that the first series of numeral-openings is adjacent to the inner edge of the rim and the last of the series is adjacent to the outer edge thereof and the intermediate series are in radial stepped relation each to the others.

4. The invention set forth in claim 2, further characterized in that each series of numeral-openings, beginning with the first series, is located at a slightly greater distance from the center of the rim than the preceding series whereby, when light is caused to intermittently shine therethrough during the rotation of the rim, a series of numerals may be imprinted upon a strip of photo-sensitive material underlying the fixed mask.

5. The invention set forth in claim 2, further characterized in that the rim and fixed mask are provided with additional rectangular openings, relatively small with respect to the first mentioned rectangular opening, the said additional openings being in radial alignment when the housing is in the proper rest-position.

6. In a photographic recorder, a rotatable lamp-housing having an inwardly directed lower rim, the said rim being provided with a plurality of series of openings, the said plurality of series being arcuately disposed in circumferential and radial succession, the openings in each series being shaped, respectively, like the numerals 1, 2, 3, 4, 5, 6, 7, 8, 9, 0, in combination with means for supporting a strip of photo-sensitive material adjacent to the lower face of said rim in a plane parallel thereto.

7. In a meter-reading recording system, a light source, means for supporting photo-sensitive material in a position to be exposed to light from said source, rotatable masking means interposed between the source and the supporting means, the masking means having a plurality of series of openings therethrough, the openings of each series being shaped, respectively, like the numerals 1, 2, 3, 4, 5, 6, 7, 8, 9, 0, each series, beginning with the first series, being located at a slightly greater distance from the center of rotation than the preceding series, and means for limiting the light to a single opening of a given series whereby, when the light is caused to intermittently shine at predetermined instants during a single revolution of the masking means, a series of numerals may be imprinted upon photo-sensitive material in position on the supporting means.

JOSEPH T. McNANEY.